Oct. 14, 1952 S. B. SMITH 2,613,940
LOUVER DAMPER WITH PRESSURE SEAL
Filed April 13, 1949 4 Sheets-Sheet 1
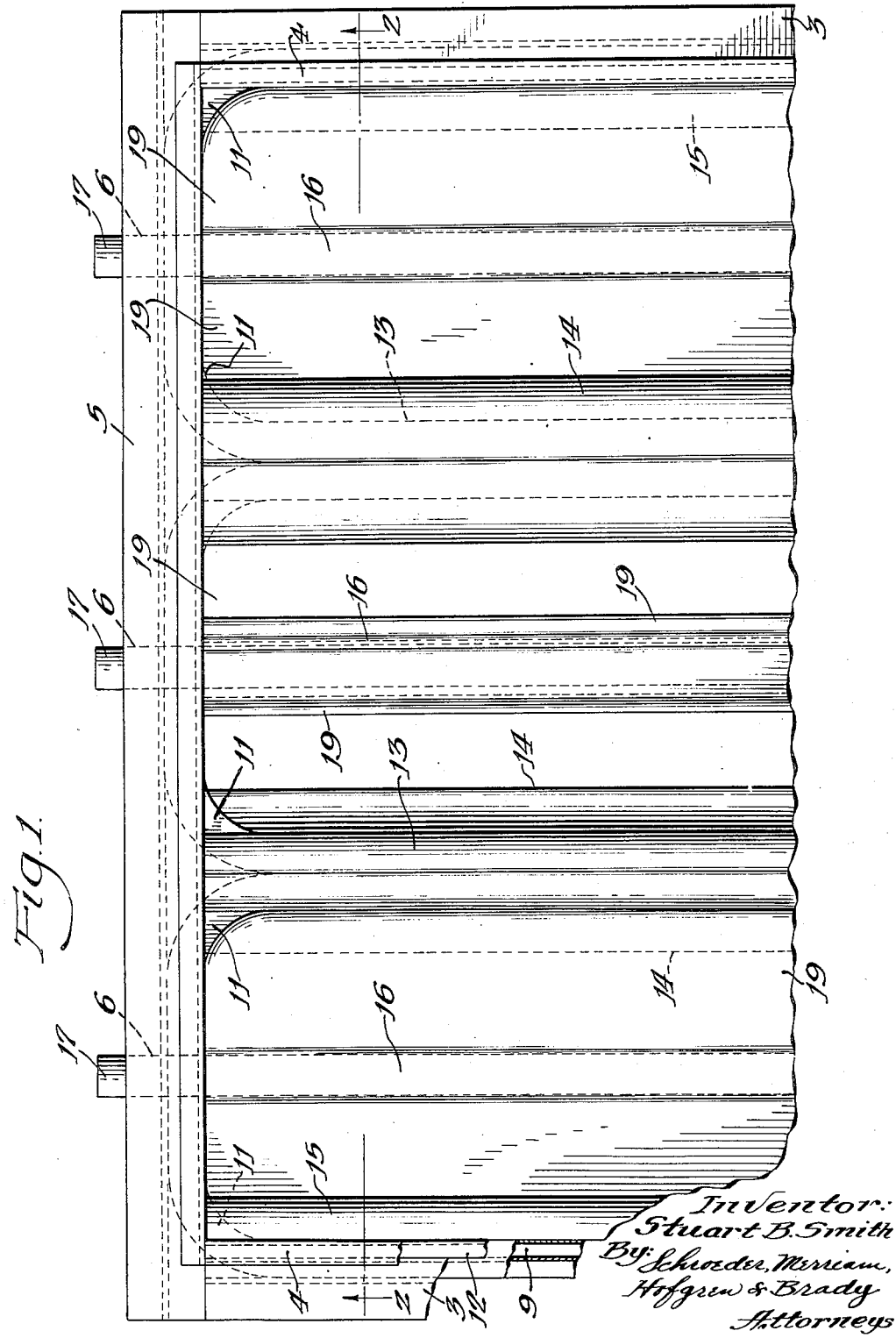
Inventor:
Stuart B. Smith
By: Schroeder, Merriam,
Hofgren & Brady
Attorneys Oct. 14, 1952 S. B. SMITH 2,613,940
LOUVER DAMPER WITH PRESSURE SEAL
Filed April 13, 1949 4 Sheets-Sheet 2
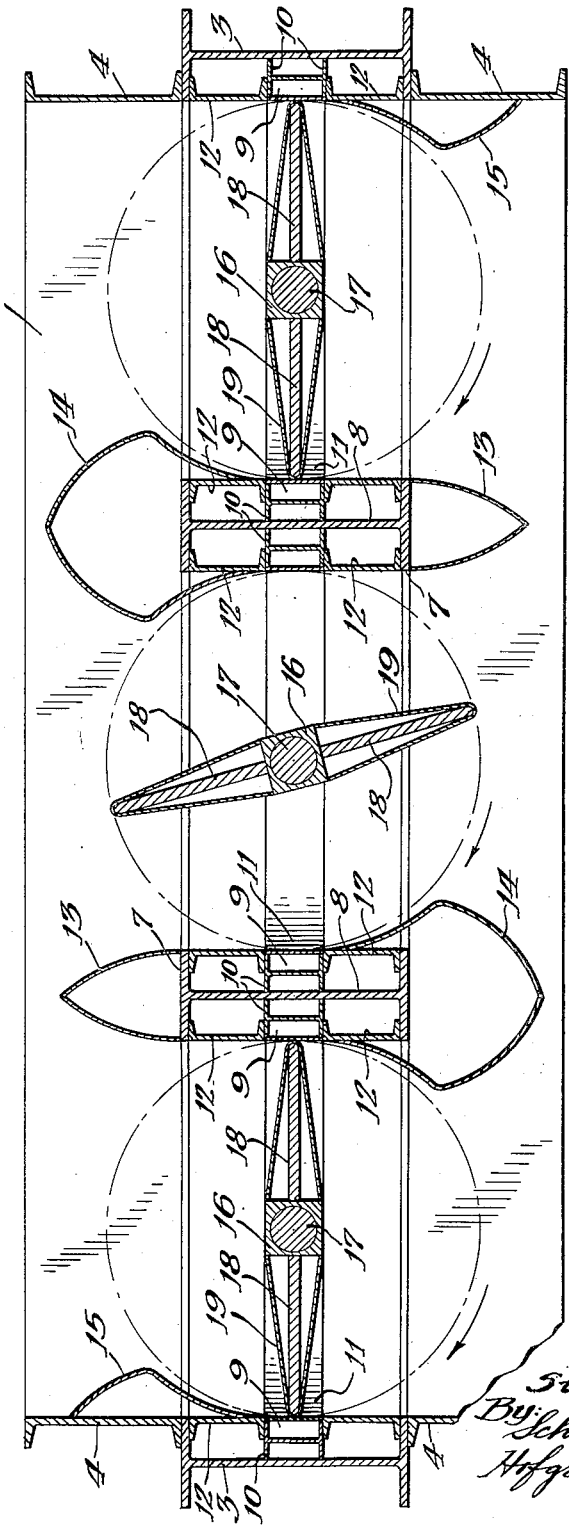
Inventor:
Stuart B. Smith
By Schroeder, Merriam,
Hofgren & Brady
Attorneys

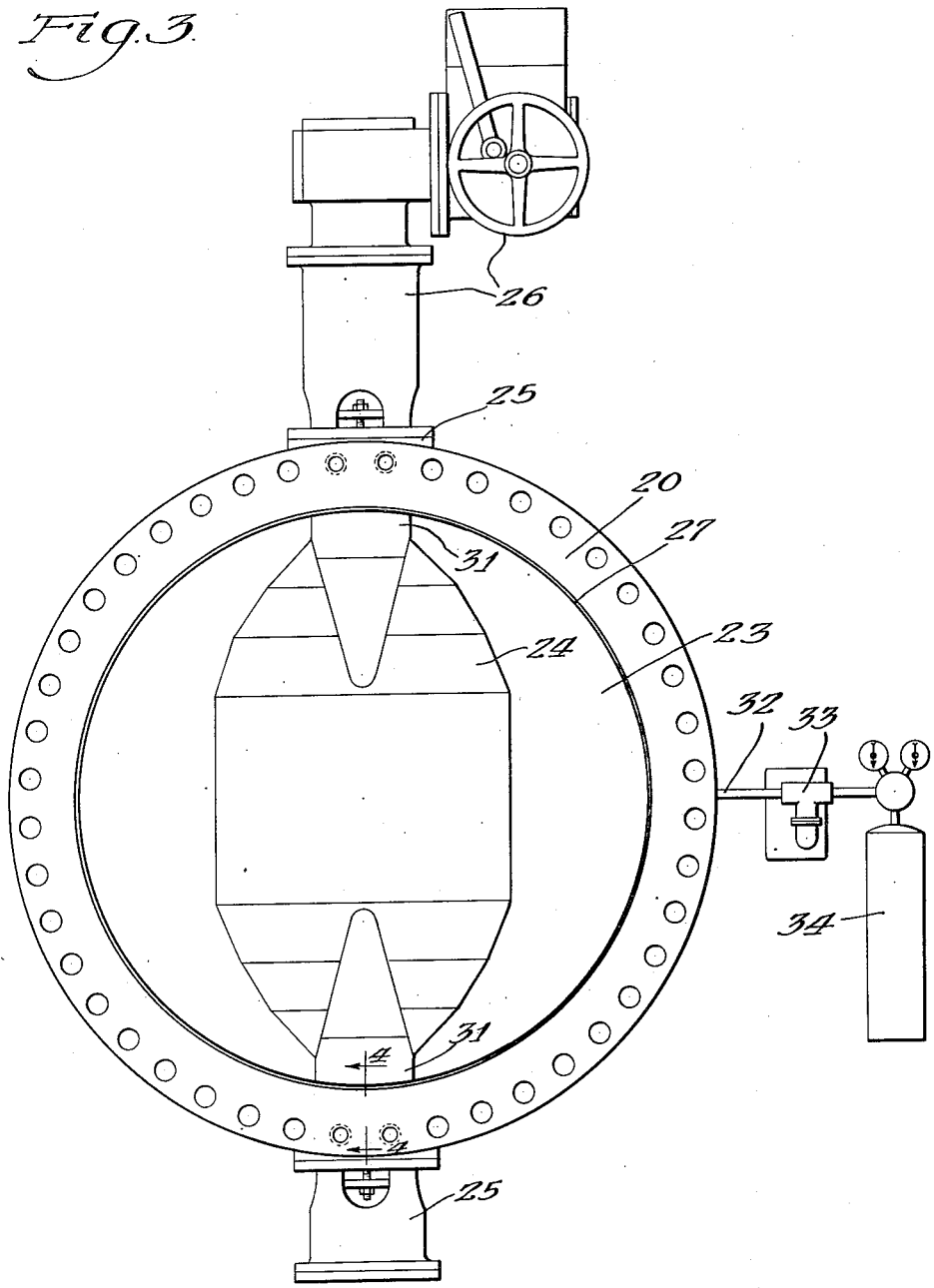

Oct. 14, 1952 S. B. SMITH 2,613,940
LOUVER DAMPER WITH PRESSURE SEAL
Filed April 13, 1949 4 Sheets-Sheet 4
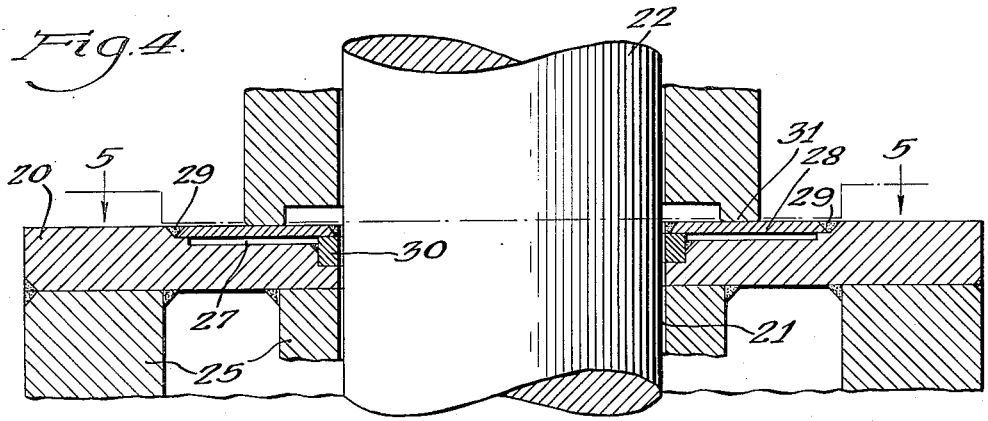
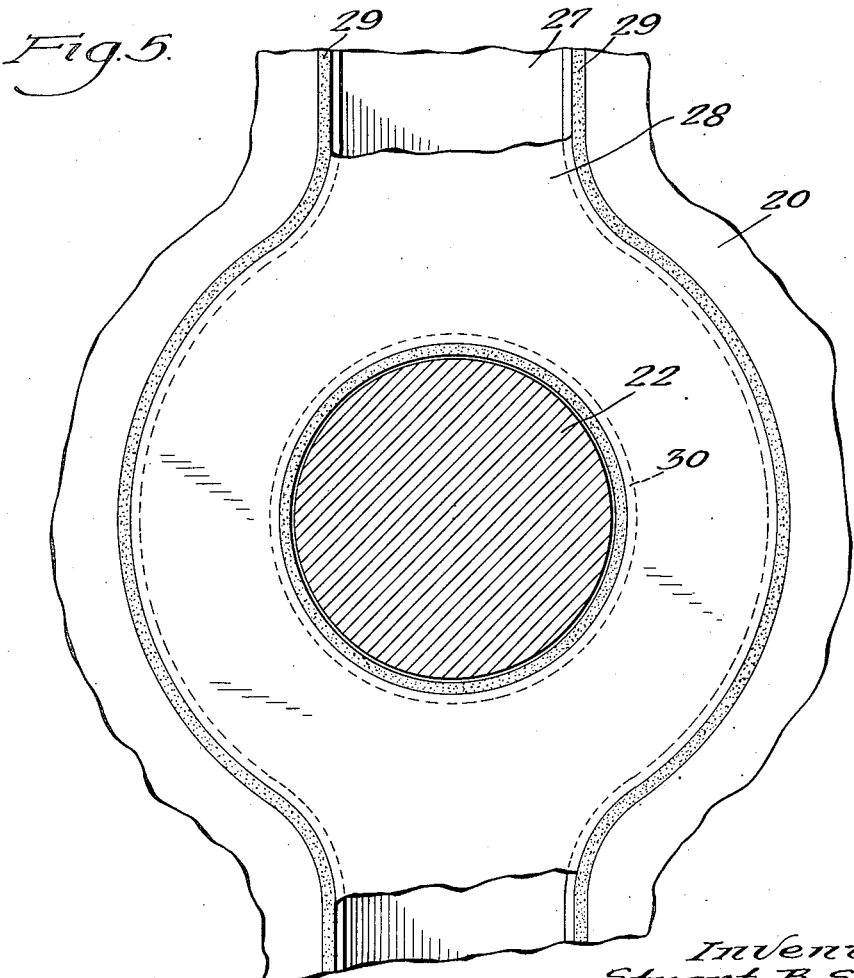
Inventor:
Stuart B. Smith
By Schroeder, Merriam, Hofgren & Brady
Attorneys Patented Oct. 14, 1952

2,613,940

UNITED STATES PATENT OFFICE 2,613,940

LOUVER DAMPER WITH PRESSURE SEAL

Stuart B. Smith, Chicago, Ill., assignor to Henry Pratt Company, a corporation of Illinois Application April 13, 1949, Serial No. 87,334

8 Claims. (Cl. 277—59)

This invention relates to all metal damper structures, and more particularly to structures in which one or a series of large metal blades are provided with metal seats which may be expanded by high internal fluid pressure to make a substantially air-tight seal.

The primary object of the invention is to provide a metal seat for the edge portions of the blade in which the edges of the metal strip, which forms the seat, are secured to the frame and are placed under tension when subjected to high fluid pressure from behind the seat. The seat and blade are made with very close tolerances, so that the metal strip is not stressed beyond its elastic limit and moves but a few thousandths of an inch to form a tight seal. The seat structure can be used with blades of various shapes, such as circular blades, parallel louver blades, or the like.

Another object of the invention is to provide an improved butterfly type of damper structure which is capable of withstanding high temperatures, for example 600° F., and although a blade may close an area of thirty-six square feet, it is capable of withstanding pressure of fifty pounds per square inch.

The construction is adapted to be used with large installations, such as wind tunnels, aircraft testing structures, and the like, where jet engines may be used.

The invention is illustrated in a preferred embodiment in the accompanying drawings, in which—

Figure 1 is a broken elevational view of a structure embodying the invention; Fig. 2 is a plan sectional view, taken as indicated at line 2—2 of Fig. 1; Fig. 3, an elevational view of a modified circular valve structure; Fig. 4, an enlarged fragmentary sectional view, taken as indicated at line 4—4 of Fig. 3; and Fig. 5, a plan sectional view of one of the end seals, taken as indicated at line 5—5 of Fig. 4.

In the embodiment illustrated in Figs. 1 and 2, a heavy metal frame is formed with I-beams 3, large channel irons 4, and engaging header members 5 in which the louver blades are journalled, as indicated at 6.

The structure is divided by two partitions 7, which are carried by large I-beams 8. Metal box-like tubular strips 9 define the openings for the louvers and have legs 10 which bear against the center web of the I-beam. The metal strips are turned inwardly across the tops and bottoms of the louver openings, as indicated at 11, and extend close to the journals 6. Channel irons 12 hold the strips within the I-beams. Preferably, the edges of the seat-forming faces of the strips are welded to the channel irons so as to be placed under tension from the channel irons when subjected to fluid pressure from behind the seat-forming faces. Each of the tubular strips 9 is connected with a source of hydraulic pressure, so that the pressure chamber may be expanded below its elastic limit, to make a substantially air-tight seal with the louver blades.

The partitions are each provided with wind deflectors. The wind deflector 13 on one side is prow shaped, and preferably is formed of heavy sheet metal which is welded to the I-beam 1. The opposite wind deflector 14 flares outwardly from the channel member 12 in a concave direction and then is turned inwardly on a convex line, to close the deflector. Preferably, the deflectors on adjacent partitions are pointed in opposite directions, to provide better flow characteristics for the air when the louvers are open. Also, deflectors 15 are preferably provided on the main frame, which are shaped as a portion of the tail-like wind deflector 14.

The louver blades preferably have a solid square shaft 16 provided with trunnions 17 to which suitable handles or actuators may be attached. Each blade has a pair of outwardly extending opposed arms 18 which have rounded edge portions and are welded to the shaft 16. The arms are embraced by V-shaped sheet metal sheaths 19 which are welded to the shaft 16 and serve to brace the arms 18 and provide a smooth outer face for the blade.

To close the structure, the louver blades are turned so that their rounded edge portions engage the tangential metal seat provided by the strips 9. Fluid pressure is then applied to the inside of the strips, causing them to bend outwardly into tight engagement with the louvers and form a substantially air-tight seal. To open the louvers, the pressure in the strips is released and the louvers may then be turned to a desired angle.

In the modification shown in Figs. 3, 4, and 5, a circular valve frame 20 is provided with bearings 21 for a circular shaft 22 on which is mounted a circular blade 23. A pair of concave metal plates 24, known as turtle-backs, are welded to the blade 23 on opposite sides. They serve to secure the blade to the shaft 22 and improve the flow characteristics of gas traveling through the valve.

Stuffing boxes 25 are provided outside of the bearings and an actuator 26 is provided for turning the shaft. A groove 27 is provided in the frame around the closed position of the blade 23. A metal strip 28 has its edge portions welded to the frame, as indicated at 29, so as to form a closure for the groove and a seat for the edge portions of the blade. As shown in Figs. 4 and 5, the groove and metal strip are widened at the journal portions of the frame to provide openings for the shaft 22. An annulus 30 is welded to the seat-forming strip 28, and is also welded to the frame 20. The ends of the blade are provided with contact rings 31, to engage the widened portions of the strip 28. Pressure may be applied to the inside of the groove by suitable piping 32 through a valve 33 from a high pressure tank 34.

It will be understood that in operating the structure shown in Fig. 3, the blade is turned to closed position and pressure is applied to the groove, so that the seat-forming strip is bowed outwardly a few thousandths of an inch and is placed under tension, below its elastic limit, and forms a tight seal.

The foregoing detailed description is given for clearness of understanding only, and no unnecessary limitations should be understood therefrom, for some modifications will be obvious to those skilled in the art.

I claim:

1. A louver damper structure comprising: a metal frame, a plurality of parallel oscillatable metal louver blades journalled in said frame and spaced apart between their centers a distance greater than the width of a blade, metal partitions between adjacent louvers, fluid-tight metal box-like tubular strips mounted on said frame and partitions to form tangential metal seats for the edges of said blades and means for connecting the interior of said strips to a source of fluid under pressure whereby said strips may be expanded by internal fluid pressure to make substantially air tight seals with said blades, said box-like strips having edge portions each fixed to a rigid portion of a partition and the frame, the cross-section of the strips being such that pressure therein will create stress in tension in the strips.

2. A structure as specified in claim 1, in which the partitions are provided at one edge with a prow-like wind deflector, and on the opposite edge with a tail-like widened wind deflector, the deflectors on adjacent partitions being pointed in opposite directions.

3. A structure as specified in claim 1, in which the louver blades each have a solid shaft and outwardly extending opposed arms radially fixed to the shaft and formed with rounded outer edges embraced by V-shaped sheet metal sheaths tapering back to the shaft and providing a smooth outer face.

4. A structure as specified in claim 1, in which the louver blades have rounded corner portions, and the box-like tubular strips follow the shape of the edges to the journals of the louvers.

5. A louver damper structure as specified in claim 1, in which the edges of the strips are welded to the frame and partitions so as to be tensioned from the frame when fluid pressure is applied inside said strips.

6. In a butterfly valve structure having a metal frame; an oscillatable shaft journalled in said frame; and a blade on said shaft adapted to close an opening in said frame; means for sealing the blade to the sides of the opening comprising a groove in the frame around the closed position of said blade; a metal strip having its edge portions welded to said frame to form a fluid-tight closure for said groove and a seat for the edge portions of said blade with said seat normally having a diameter greater than the diameter of the blade to provide a space between the blade and the seat when the blade is in closed position with the space being less than the elastic limit of the metal strip; and means for introducing fluid pressure into said groove to tension said strip below its elastic limit to decrease the diameter of the seat to cause the strip to make a substantially air tight seat with said blade.

7. A valve as specified in claim 6, in which the groove and metal strip are widened at the journal portions of the frame to provide openings for the shaft, and the ends of the blade are provided with contact rings to engage said widened portion of said strip.

8. A valve as specified in claim 6, in which the groove and metal strip are widened at the journal portions of the frame to provide openings for the shaft, an annulus is welded to said frame and to said strip around said opening, and outwardly presented contact rings are provided on said shaft to engage said widened portion of the strip.

STUART B. SMITH.

REFERENCES CITED

The following references are of record in the file of this patent:

UNITED STATES PATENTS

| Number | Name | Date |
| --- | --- | --- |
| 1,756,060 | Hawks | Apr. 29, 1930 |
| 1,844,641 | DeWein | Feb. 9, 1932 |
| 1,872,599 | LeGrand | Aug. 16, 1932 |
| 1,977,351 | Phillips | Oct. 16, 1934 |
| 1,990,309 | Phillips | Feb. 5, 1935 |
| 2,059,656 | Ring | Nov. 3, 1936 |
| 2,082,335 | Hart | June 1, 1937 |

FOREIGN PATENTS

| Number | Country | Date |
| --- | --- | --- |
| 197,000 | Great Britain | of 1923 |